US009650092B1

(12) United States Patent
Tsai (10) Patent No.: US 9,650,092 B1
(45) Date of Patent: May 16, 2017

(54) FOLDABLE PARKING RACK FOR BICYCLE

(71) Applicant: JYIN SHENG CO., LTD., Changhua County (TW)

(72) Inventor: Yu-Lung Tsai, Changhua County (TW)

(73) Assignee: Jyin Sheng Co., Ltd., Changhau County (TW)

( * ) Notice: Subject to any disclaimer, the term of this patent is extended or adjusted under 35 U.S.C. 154(b) by 0 days.

(21) Appl. No.: 15/085,147

(22) Filed: Mar. 30, 2016

(30) Foreign Application Priority Data

Jan. 21, 2016 (TW) .............................. 105200921 U (51) Int. Cl.
*A47F 7/04* (2006.01)
*B62H 3/00* (2006.01)
*B62H 3/04* (2006.01)
*B62H 3/08* (2006.01)

(52) U.S. Cl.
CPC ................. *B62H 3/04* (2013.01); *A47F 7/04* (2013.01); *B62H 3/08* (2013.01)

(58) Field of Classification Search
CPC .... B62H 3/04; B62H 3/06; B62H 3/08; A47F 7/04; A47F 7/00
See application file for complete search history.

(56) References Cited

U.S. PATENT DOCUMENTS

| | | | | | |
|---|---|---|---|---|---|
| 5,301,817 A | * | 4/1994 | Merritt | ...................... | A47F 7/04 211/20 |
| 5,988,402 A | * | 11/1999 | Mayfield | .................. | B62H 3/04 211/20 |
| 6,062,396 A | * | 5/2000 | Eason | ....................... | A47F 7/04 211/20 |

FOREIGN PATENT DOCUMENTS

| | | | |
|---|---|---|---|
| DE | 102010015986 B3 * | 9/2011 | ........... B25H 1/0014 |
| TW | M401598 U1 | 4/2011 | |
| TW | I369309 B1 | 8/2012 | |

\* cited by examiner

*Primary Examiner* — Leslie A Nicholson, III
*Assistant Examiner* — Kimberley S Wright
(74) *Attorney, Agent, or Firm* — Muncy, Geissler, Olds & Lowe, P.C.

(57) ABSTRACT

A foldable parking rack for a bicycle includes a base and a limiting device. The base has a wheel receiving frame having two elongated limiting members and two abutting members concaved with two abutting recesses respectively. An accommodating space is formed between the two elongated limiting members and between the two abutting members. The limiting device has a swinging bar, a spring, and two limiting cones installed at an end of the swinging bar in a way that peaks of the two limiting cones are pointed towards each other. When the swinging bar is swung about a pivot, a body of the swinging bar is swung correspondingly to the accommodating space and the two abutting recesses in a way that the juncture of the peaks of the two limiting cones corresponds to the accommodating space and the two abutting recesses.

7 Claims, 10 Drawing Sheets

FOLDABLE PARKING RACK FOR BICYCLE

BACKGROUND OF THE INVENTION

1. Field of the Invention

The present invention relates generally to parking racks and more particularly, to a foldable parking rack for a bicycle.

2. Description of the Related Art

Taiwan Patent No. I369309B1 disclosed a foldable parking rack for a bicycle, which includes a base, an abutment device and a plurality of supporting feet. An accommodating portion is formed between two ends of the base for accommodating a wheel of the bicycle parked on the base. An end of the abutment device, namely first end, is rotatably connected with an end of the base. Another end of the abutment device, namely second end, is rotatably connected with an end of an abutting member. The abutment device is rotatable relative to the base between an abutting position and a folded position. When the abutment device is located at the abutting position, the wheel of the bicycle can be stopped against the abutting member. When the abutment device is located at the folded position, it is folded on the base. The supporting feet are rotatably connected with the base and rotatable between a first position and a second position. When the supporting feet are located at the first position, they are spread out of the base. When the supporting feet are located at the second position, they are folded in the base.

In the aforesaid foldable parking rack for the bicycle, the abutment device is rotatably connected with the base and can be folded on the base by being rotated relative to the base; only one end of the abutting member is rotatably connected with the second end of the abutment device, but the other end of the abutting member is suspended. Therefore, when the wheel of the bicycle is stopped against the abutting member, the weight of the wheel may cause the abutting member to descend to the suspended end. Such arrangement disables the abutting member from bearing the weight of the wheel evenly, so the foldable parking rack for the bicycle still needs improvement.

Taiwan Patent No. M401598 disclosed a bicycle parking rack including a base, and a front positioning frame and a rear positioning frame installed on two sides of the base respectively. The front positioning frame has two straight rods, the bottom ends of which are rotatably connected with the base. A first accommodating zone is formed between the two straight rods. An abutting wheel is rotatably connected with the top ends of the two straight rods and located therebetween. The rear positioning frame has a second accommodating zone. The first and second accommodating zones are adapted for a wheel of a bicycle to be disposed therein and therebetween, and the abutting wheel is adapted for the wheel to be stopped there against, so that the bicycle can be parked on the bicycle parking rack.

The aforesaid bicycle parking rack has the front and rear positioning frames, and the front positioning frame has the two straight rods for the abutting wheel to be rotatably connected therebetween. Although the bicycle parking rack is adapted for the wheel of the bicycle to be stopped thereon, the bicycle parking rack is uneasy in manufacture and assembly because of having many components combined complicatedly, so the bicycle parking rack still needs improvement.

SUMMARY OF THE INVENTION

It is a primary objective of the present invention to provide a foldable parking rack for a bicycle, which is capable of being folded and stabilizing the wheel of the bicycle parked thereon in unfolded state.

To attain the above objective, the present invention provides a foldable parking rack for a bicycle, which primarily includes a base and a limiting device.

The base has a wheel receiving frame and a first connector. The wheel receiving frame has two elongated limiting members and two abutting members attached to two ends of each of the two elongated limiting members respectively and concaved at middle parts thereof with two abutting recesses respectively. An accommodating space is formed between the two elongated limiting members and between the two abutting members. An end of the first connector is attached to an outer end of one of the abutting members. The limiting device has a swinging bar, two limiting cones, a pivot and a spring. The swinging bar is provided at an end thereof with a second connector. The pivot is inserted through the first connector and the second connector. Each of the limiting cones has a peak and a bottom. The two limiting cones are installed at another end of the swinging bar in a way that the peaks of the two limiting cones are pointed towards each other and the bottoms of the two limiting cones are located by two sides of the swinging bar respectively. The spring is sleeved onto the pivot. When the swinging bar is swung about the pivot, a body of the swinging bar is swung correspondingly to the accommodating space and the two abutting recesses in a way that a juncture of the peaks of the two limiting cones corresponds to the accommodating space and the two abutting recesses. The spring provides the swinging bar a restoring elastic force after the swinging bar is swung.

As a result, when the swinging bar of the present invention is swung about the pivot, the swinging bar is swung correspondingly to the accommodating space and the two abutting recesses in a way that the juncture of the peaks of the two limiting cones corresponds to the accommodating space and the two abutting recesses, so that the two limiting cones can hold the wheel therebetween so as to bear the weight of the wheel evenly. Therefore, the two limiting cones can be prevented from descent resulted from bearing the weight of the wheel unevenly.

DETAILED DESCRIPTION OF THE INVENTION

The technical features of the present invention will be fully understood from the detailed description of the preferred embodiments given hereunder and the accompanying drawings.

Referring to FIGS. 1-7, a foldable parking rack 100 for a bicycle according to a first preferred embodiment of the present invention is primarily composed of a base 10 and a limiting device 40.

Figure 1:
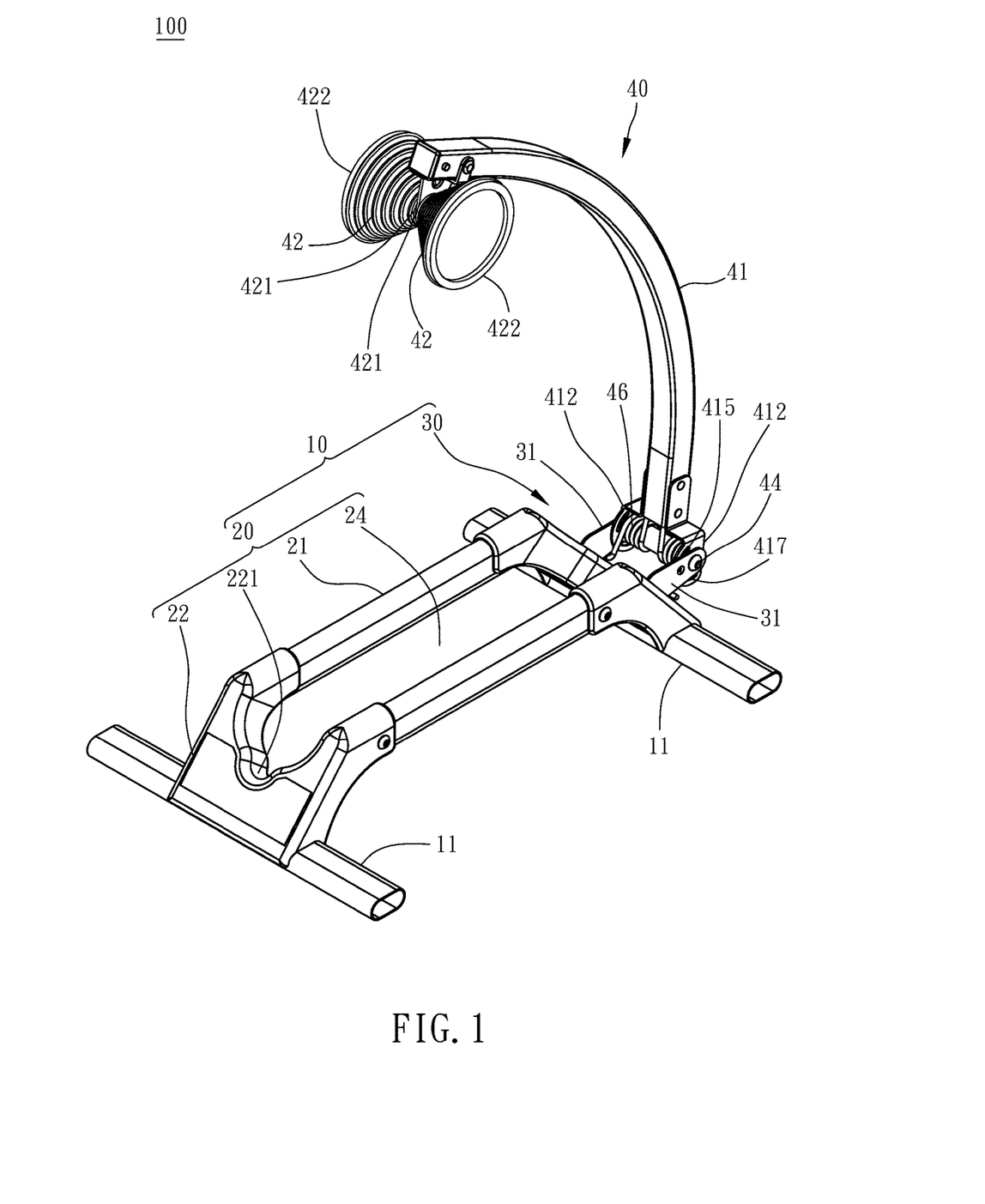
FIG. 1 is a perspective view of a first preferred embodiment of the present invention.

The base 10 has a wheel receiving frame 20 and a first connector 30. As shown in FIG. 1, the wheel receiving frame 20 has two elongated limiting members 21, and two abutting members 22 attached to two ends of each of the two elongated limiting members 21 respectively. Each of the abutting members 22 is concaved at a middle part thereof with an abutting recess 221. An accommodating space 24 is formed between the two elongated limiting members 21 and between the two abutting members 22. An end of the first connector 30 is attached to an outer end of one of the abutting members 22.

Figure 2:
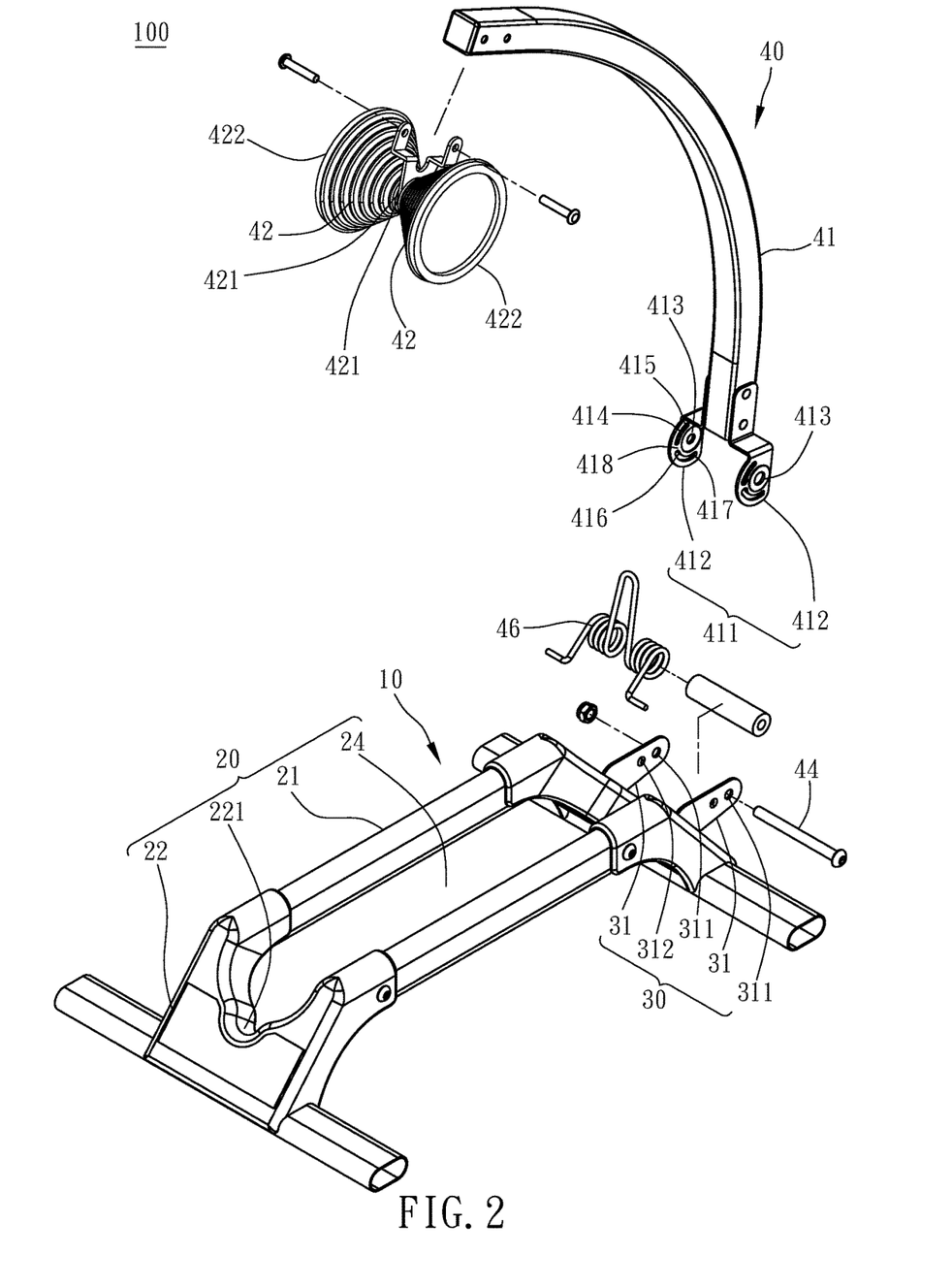
FIG. 2 is an exploded perspective view of the first preferred embodiment of the present invention, showing the perspective view of a base, a swinging bar, two limiting cones, a pivot and a spring.

Referring to FIG. 2, the first connector 30 of the base 10 in this first preferred embodiment includes two first connecting sheets 31 parallel to each other and corresponding in position to each other. Two first through holes 311 corresponding in position to each other are provided at the two first connecting sheets 31 respectively.

The limiting device 40 has a swinging bar 41, two limiting cones 42, a pivot 44 and a spring 46. As shown in FIG. 2, the swinging bar 41 is provided at an end thereof with a second connector 411. The pivot 44 is inserted through the first connector 30 and the second connector 411. Each of the limiting cones 42 has a peak 421 and a bottom 422. The two limiting cones 42 are installed at the other end of the swinging bar 41 in a way that the peaks 421 of the two limiting cones 42 are pointed towards each other and the bottoms 422 of the two limiting cones 42 are located by two sides of the swinging bar 41 respectively. The spring 46 is sleeved onto the pivot 44. Referring to FIG. 2, the second connector 411 of the swinging bar 41 in this first preferred embodiment includes two second connecting sheets 412 parallel to each other and corresponding in position to each other. Two second through holes 413 corresponding in position to each other are provided at the two second connecting sheets 412 respectively. Two outer sides of the two second connecting sheets 412 face two inner sides of the two first connecting sheets 31 respectively. The two first through holes 311 are located correspondingly to the two second through holes 413 respectively.

Referring to FIG. 2, the two inner sides of the two first connecting sheets 31 are respectively protruded with two positioning protrusion 312 corresponding in position to each other.

Figure 3:
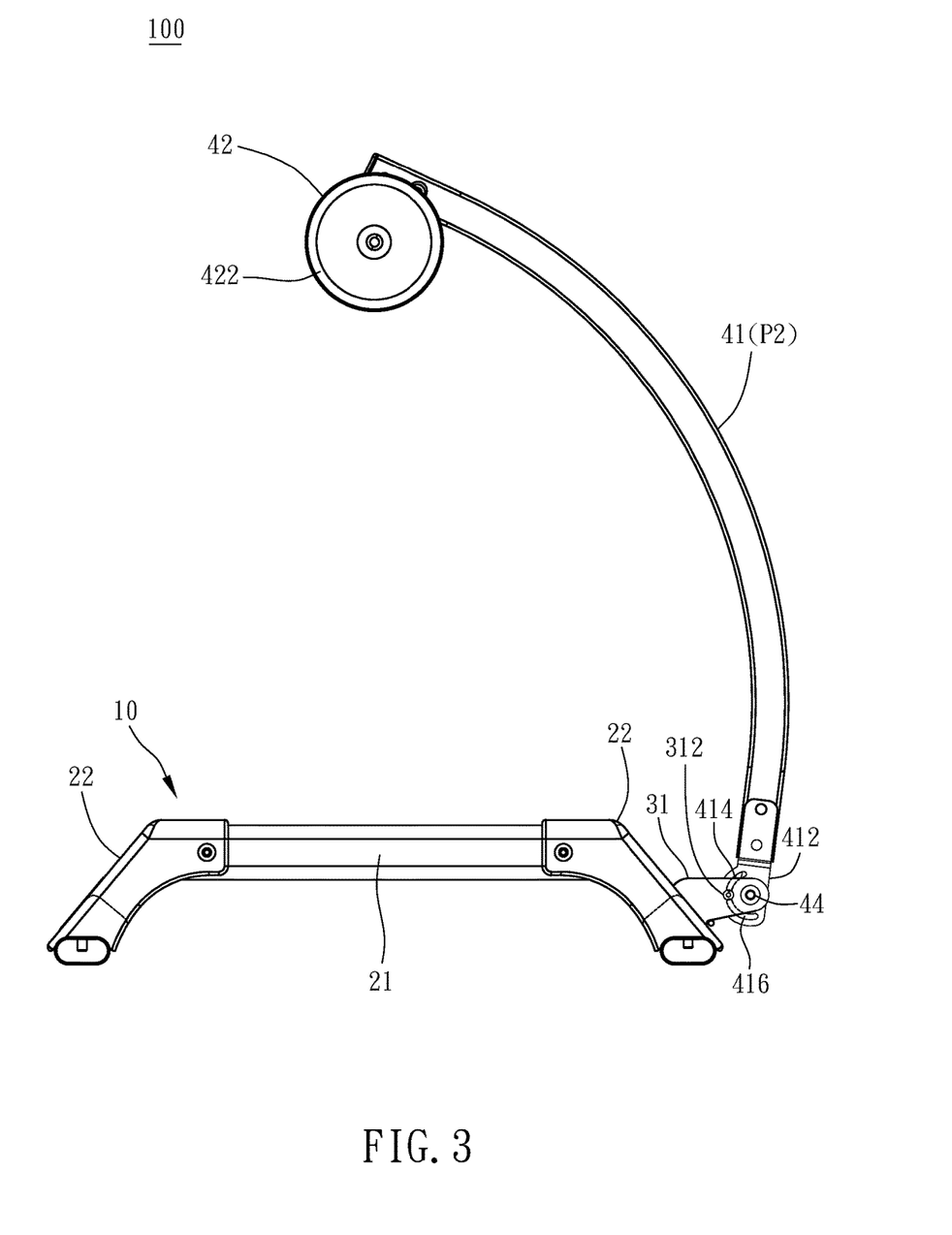
FIG. 3 is a lateral view of the first preferred embodiment of the present invention.
Figure 4:
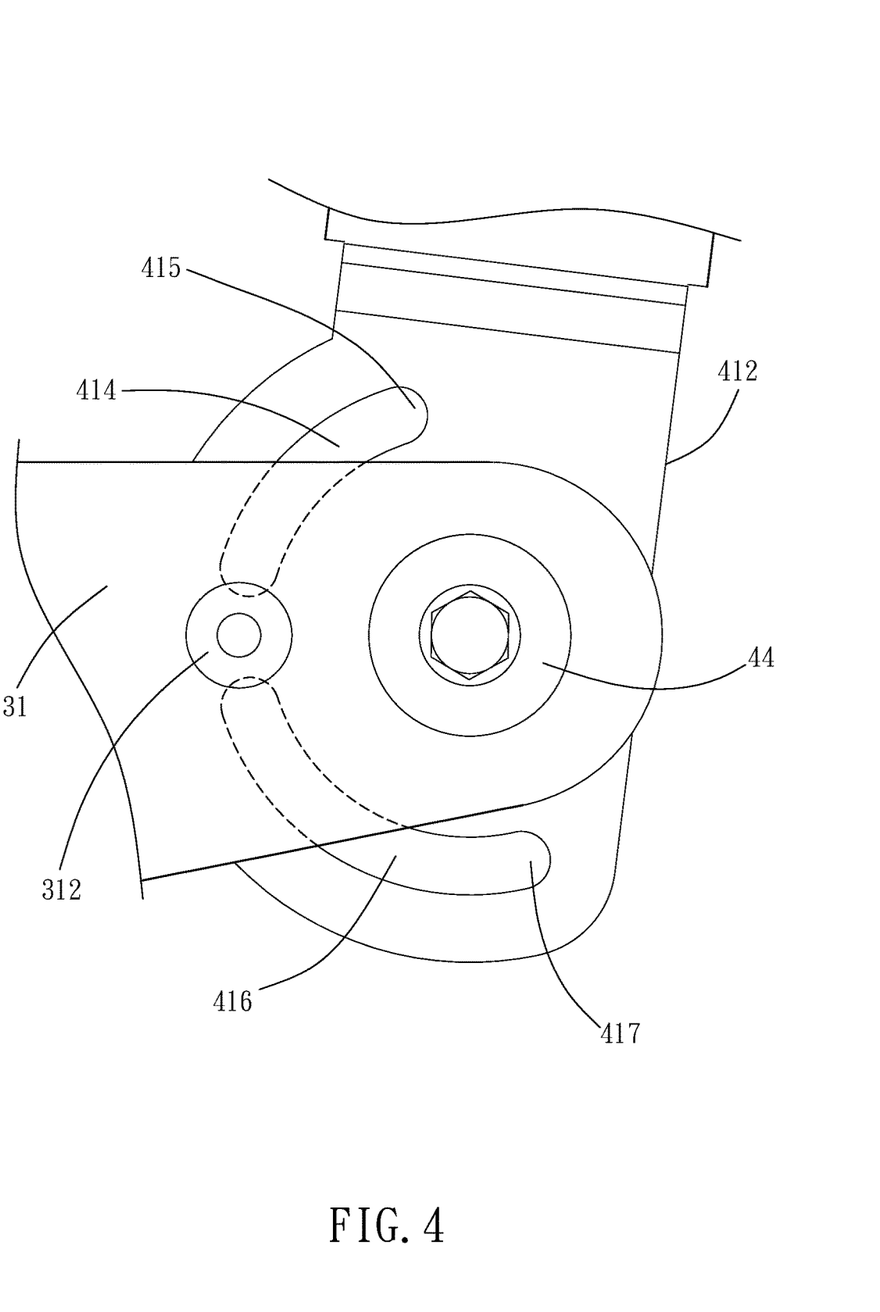
FIG. 4 is an enlarged view of a part of the first preferred embodiment of the present invention, showing that a positioning protrusion is abutted against an abutting section.

Referring to FIGS. 2-4, each of the two second connecting sheets 412 in this first preferred embodiment has a first groove 414, a second groove 416, and an abutting section 418 located between the first groove 414 and the second groove 416 and having two ends adjacent to an end of the first groove 414 and an end of the second groove 416 respectively. The two positioning protrusions 312 are capable of being abutted against the two abutting sections 418 respectively. The other end of each of the first grooves 414 is defined as a folding end 415, and the other end of each of the second grooves 416 is defined as an unfolding end 417. Each of the positioning protrusions 312 is capable of being stopped against the folding end 415 and the unfolding end 417 so that the swinging bar 41 is capable of being swung relative to the accommodating space 24 in a range defined by the folding ends 415 and the unfolding ends 417, as shown in FIG. 1.

Referring to FIG. 1, each of two opposite sides of the base 10 in this first preferred embodiment is extended with at least one supporting part 11. The amount of the at least one supporting part 11 is two.

Figure 5:
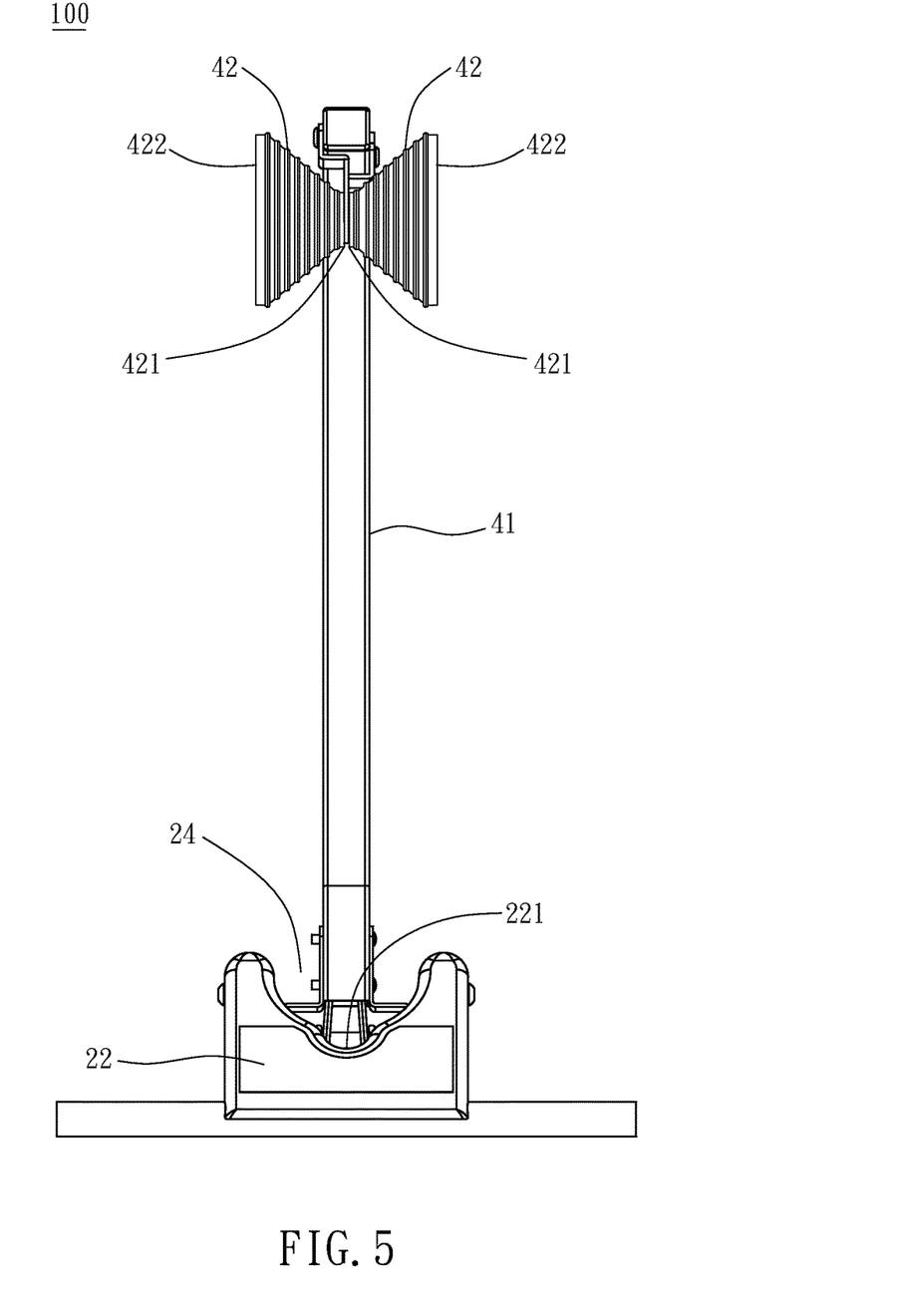
FIG. 5 is a front view of the first preferred embodiment of the present invention.

When the swinging bar 41 is swung about the pivot 44, the body of the swinging bar 41 is swung correspondingly to the accommodating space 24 and the two abutting recesses 221 in a way that the juncture of the peaks 421 of the two limiting cones 42 corresponds to the accommodating space 24 and the two abutting recesses 221. The spring 46 provides the swinging bar 41 a restoring elastic force after the swinging bar 41 is swung, as shown in FIG. 1. The body of the swinging bar 41 is in alignment with a juncture of the peaks 421 of the two limiting cones 42, as shown in FIG. 5.

Figure 9:
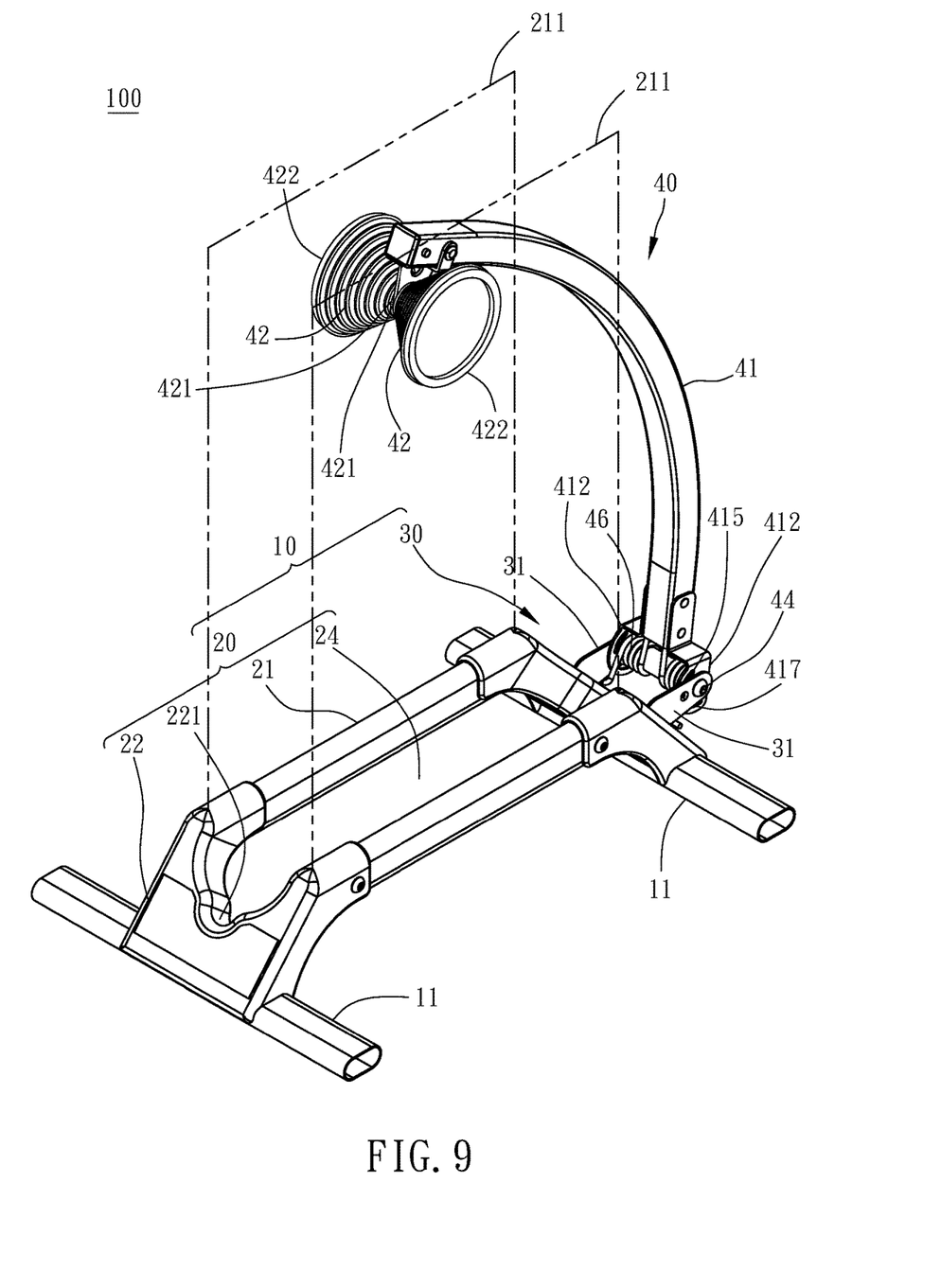
FIG. 9 is a perspective view of a first preferred embodiment of the present invention.
Figure 10:
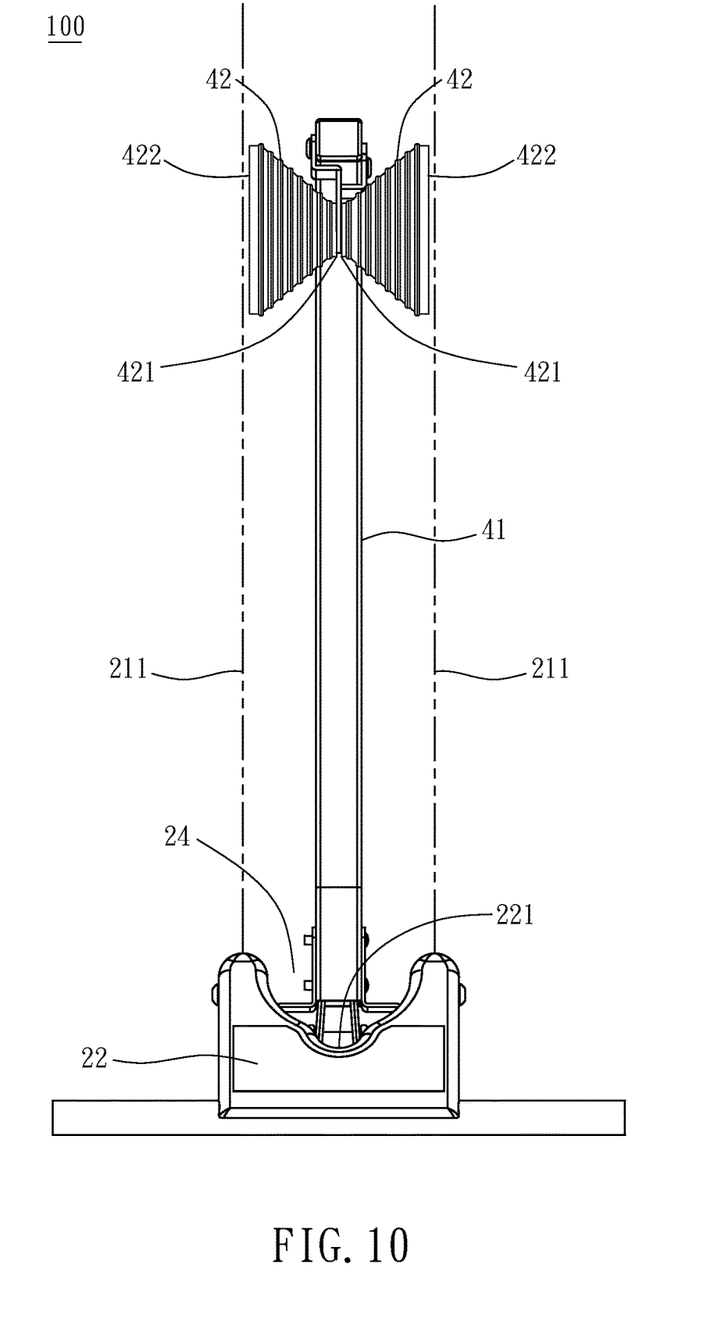
FIG. 10 is a front view of the first preferred embodiment of the present invention.

When the swinging bar 41 is swung about the pivot 44, the body of the swinging bar 41 is swung between two imaginary vertical planes 211, in which the two elongated limiting members 21 are respectively situated, as shown in FIGS. 9 and 10.

The above description illustrates the structure of this first preferred embodiment of the present invention, and the usage of this first preferred embodiment of the present invention is described below.

Figure 6:
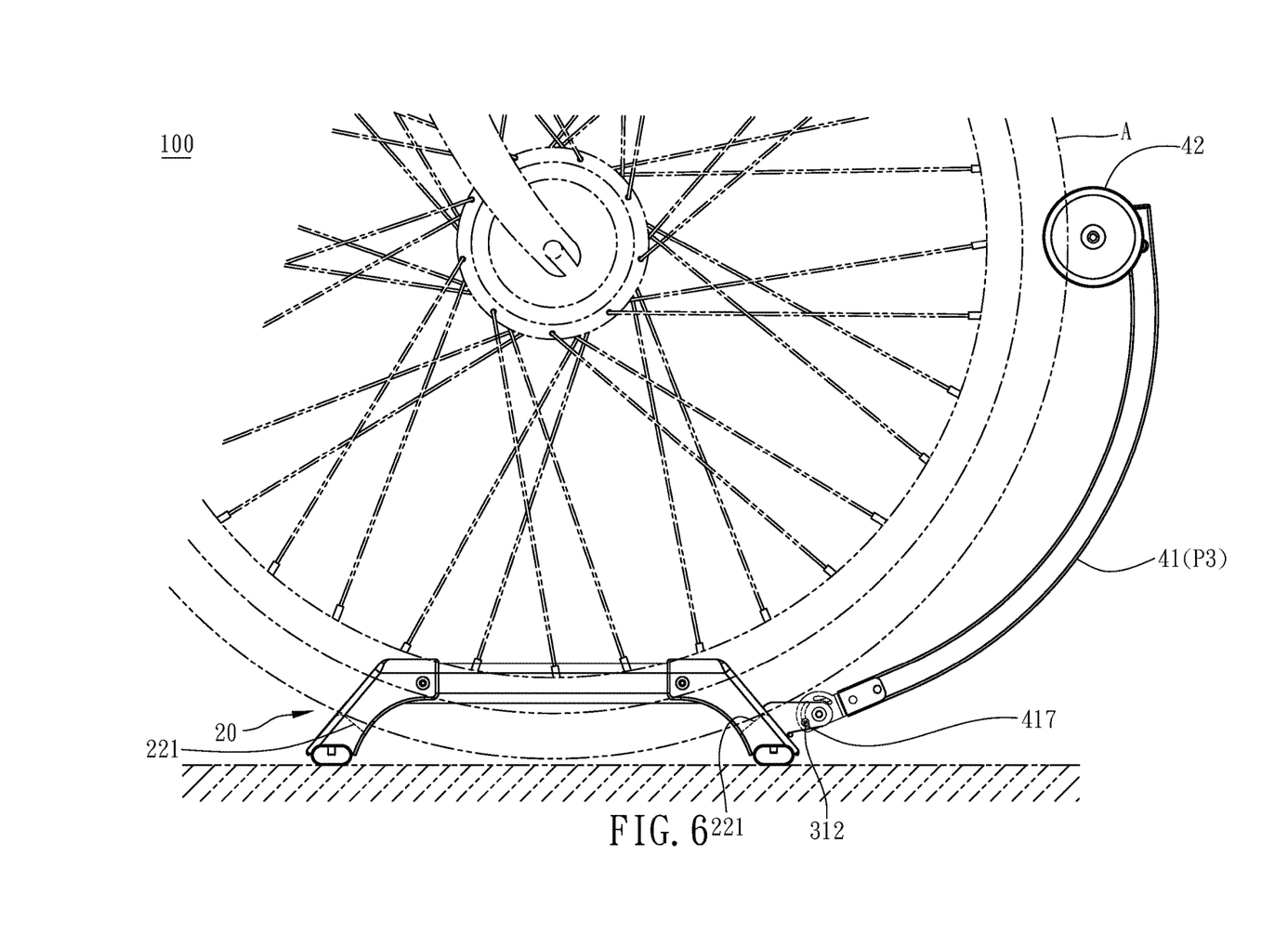
FIG. 6 is a lateral view showing a usage state of the first preferred embodiment of the present invention, wherein a wheel is hold between the two limiting cones.
Figure 7:
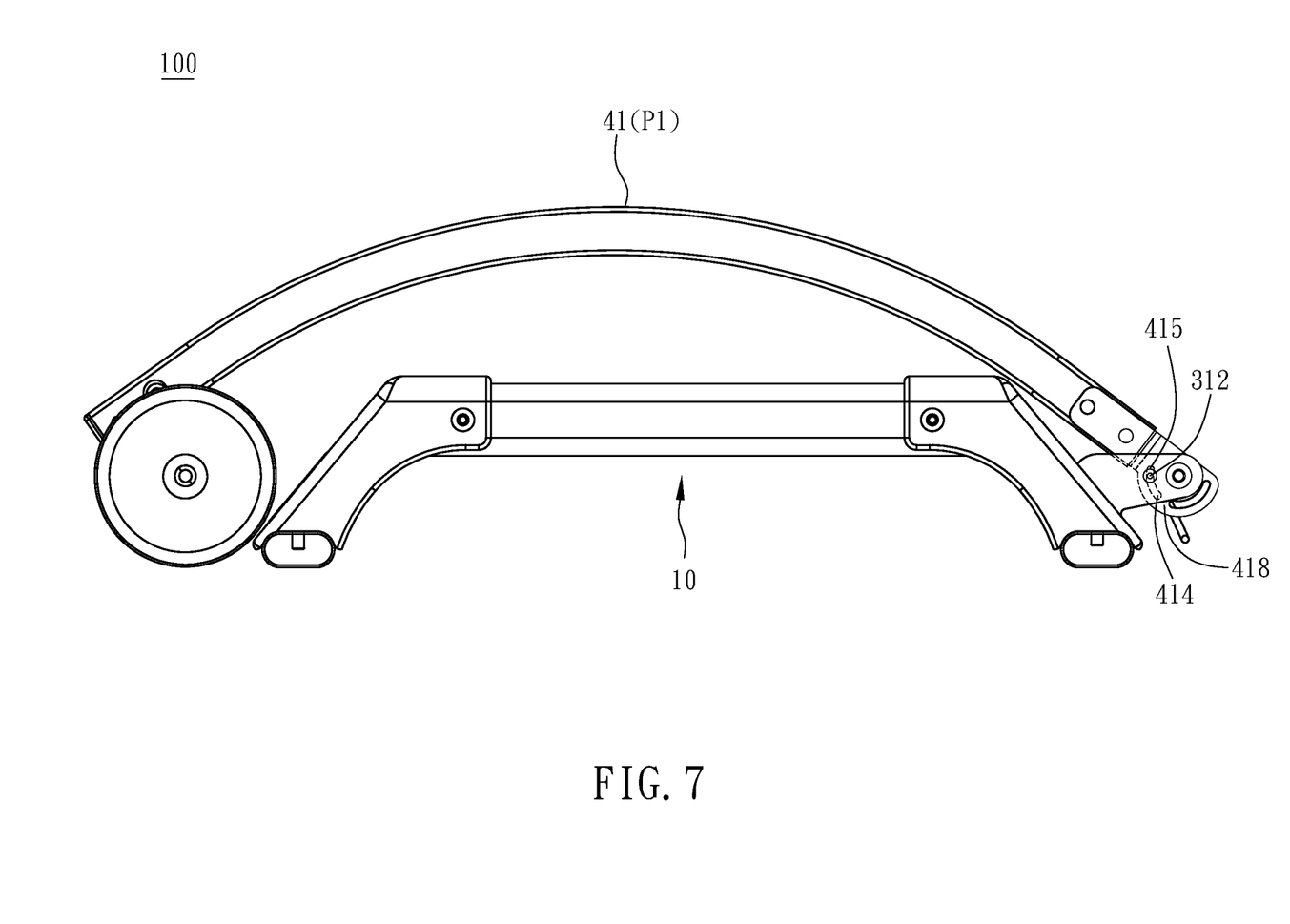
FIG. 7 is a lateral view showing a folded state of the first preferred embodiment of the present invention, wherein the swinging bar is folded on the base.

Referring to FIG. 7, when the foldable parking rack 100 for the bicycle is in a folded state, the swinging bar 41 is folded on the base 10, the two positioning protrusions 312 are abutted against the folding ends 415 of the two first grooves 414 respectively, and the swinging bar 41 is located at a folded position P1. When the foldable parking rack 100 for the bicycle is to be used, the swinging bar 41 is unfolded by being swung away from the accommodating space 24, so that the foldable parking rack 100 for the bicycle is in an unfolded state as shown in FIGS. 1-3. At this time, the two positioning protrusions 312 are abutted against the two abutting sections 418 respectively, and the swinging bar 41 is located at an unfolded position P2. After that, as shown in FIG. 6, a wheel A can be positioned on the wheel receiving frame 20 in a way that the wheel A is stopped against the two abutting recesses 221 and located in the accommodating space 24, and the juncture of the two limiting cones 42 is pushed by the wheel A to drive the swinging bar 41 to swing to a usage position P3 where the two positioning protrusions 312 are located in the two second grooves 416. At this time, the restoring elastic force of the spring 46 drives the two limiting cones 42 to hold the wheel A therebetween. The position of the two positioning protrusions 312 can be adjusted between the unfolding end 417 and the other end of each second groove 416 by the wheel A, depending on the size of the wheel A. Therefore, the position of the swinging bar 41 is adjustable by the wheel A, so that the two limiting cones can hole the wheel A of various size therebetween elastically. Referring to FIG. 5 as well, the swinging bar 41 is swung correspondingly to the accommodating space 24 and the two abutting recesses 221 in a way that the juncture of the peaks 421 of the two limiting cones 42 corresponds to the accommodating space 24 and the two abutting recesses 221. When the wheel A is hold between the two limiting cones 42 elastically, the two limiting cones 42 bear the weight of the wheel A evenly. Therefore, the wheel A is avoided causing the two limiting cones 42 to descend.

It is appreciated that when the swinging bar 41 is swung, it is the restoring elastic force of the spring 46 to enable the two limiting cones 42 to hold the wheel A therebetween elastically. Even though the foldable parking rack 100 have no such positioning protrusion 312, first groove 414, second groove 416 and abutting section 418, it will not be affected that the swinging bar 41 can be swung and the two limiting cones 42 can hold the wheel A therebetween.

It can be understood from the above description that the present invention is effective in solving the problem of one of the above-mentioned prior arts that the conventional abutting wheel is rotatably connected between the top ends of the two straight rods, but the complicated composition of the two straight rods brings difficulty in manufacture and assembly. In the other above-mentioned prior art, only one end of the abutting member is rotatably connected with the second end of the abutment device, but the other end of the abutting member is suspended. Therefore, when the wheel of the bicycle is stopped against the abutting member, the weight of the wheel may cause the abutting member to descend to the suspended end. Such arrangement brings the problem that the abutting member can't bear the weight of the wheel evenly. In the present invention, the two limiting cones 42 are installed on a single swinging bar 41; therefore, such structure is relatively simpler, thereby convenient in manufacture and assembly. In the present invention, when the swinging bar 41 is swung about the pivot 44, the swinging bar 41 is swung correspondingly to the accommodating space 24 and the two abutting recesses 221 in a way that the juncture of the peaks 421 of the two limiting cones 42 corresponds to the accommodating space 24 and the two abutting recesses 221. When the wheel A is hold between the two limiting cones 42 elastically, the two limiting cones 42 bear the weight of the wheel A evenly. Therefore, the wheel A is avoided causing the two limiting cones 42 to descend.

In the above description of the first preferred embodiment, each of the two opposite sides of the base 10 is extended with at least one supporting part 11, and the amount of the at least one supporting part 11 is two for example, but not limited thereto in practice. Each of the two opposite sides of the base 10 may be extended with only one supporting part 11, which is understandable by reference to the first preferred embodiment, thereby not illustrated by drawings.

In the above description of the first preferred embodiment, the two limiting cones 42 are disposed in a way that the peaks 421 of the two limiting cones 42 are pointed towards each other, but not limited thereto in practice. The two limiting cones 42 may be made integrally, which is understandable by reference to the first preferred embodiment, thereby not illustrated by drawings.

Figure 8:
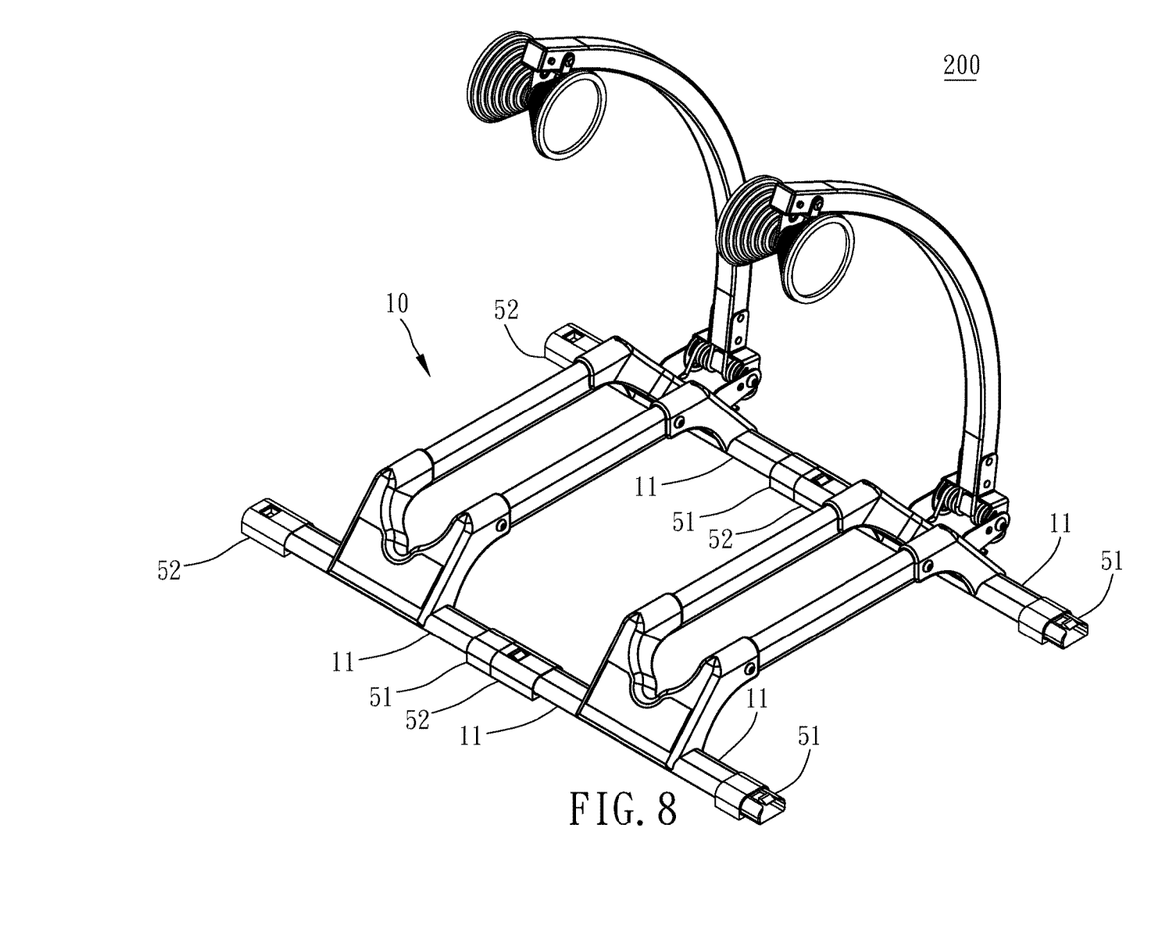
FIG. 8 is a perspective view of a second preferred embodiment of the present invention, showing that the base is provided with protruded connecting blocks and recessed connecting blocks.

Referring to FIG. 8, a foldable parking rack 200 for a bicycle according to a second preferred embodiment of the present invention is approximately the same with the above-mentioned first preferred embodiment except that in the foldable parking rack 200, each of the supporting parts 11 of one of the two opposite sides of the base 10 is provided at a terminal thereof with a protruded connecting block 51, and each of the supporting parts 11 of the other of the two opposite sides of the base 10 is provided at a terminal thereof with a recessed connecting block 52 capable of being engaged with the protruded connecting block 51.

Referring to FIG. 8, the usage of the second preferred embodiment of the present invention is that two foldable parking racks 200 can be connected side by side by connecting the two bases 10 side by side in a way that the protruded connecting blocks 51 of one of the bases 10 are engaged with the recessed connecting blocks 52 of the other base 10 respectively.

The other structures of the second preferred embodiment are the same as that of the first preferred embodiment, which will not repeatedly mentioned here.

What is claimed is:

1. A foldable parking rack for a bicycle, the foldable parking rack comprising:
    a base having a wheel receiving frame, which has two elongated limiting members and two abutting members attached to two ends of each of the two elongated limiting members respectively and concaved at middle parts thereof with two abutting recesses respectively, and a first connector, an end of which is attached to an outer end of one of the abutting members, an accommodating space being formed between the two elongated limiting members and between the two abutting members; and
    a limiting device having a swinging bar provided at an end thereof with a second connector, two limiting cones, each of which has a peak and a bottom, a pivot inserted through the first connector and the second connector, and a spring sleeved onto the pivot, the two limiting cones being installed at another end of the swinging bar in a way that the peaks of the two limiting cones are pointed towards each other and the bottoms of the two limiting cones are located by two sides of the swinging bar respectively,
    wherein when the swinging bar is swung about the pivot, a body of the swinging bar is swung correspondingly to the accommodating space and the two abutting recesses in a way that a juncture of the peaks of the two limiting cones corresponds to the accommodating space and the two abutting recesses; the spring provides the swinging bar a restoring elastic force after the swinging bar is swung,
    wherein when the swinging bar is swung about the pivot, the body of the swinging bar is swung between two imaginary vertical planes, in which the two elongated limiting members are respectively situated, and
    wherein the body of the swinging bar is in alignment with a juncture of the peaks of the two limiting cones.

2. The foldable parking rack as claimed in claim 1, wherein the first connector of the base comprises two first connecting sheets parallel to each other and corresponding in position to each other; two first through holes corresponding in position to each other are provided at the two first connecting sheets respectively; the second connector of the swinging bar comprises two second connecting sheets parallel to each other and corresponding in position to each other; two second through holes corresponding in position to each other are provided at the two second connecting sheets respectively; two outer sides of the two second connecting sheets face two inner sides of the two first connecting sheets respectively; the two first through holes are located correspondingly to the two second through holes respectively.

3. The foldable parking rack as claimed in claim 2, wherein the two inner sides of the two first connecting sheets are respectively protruded with two positioning protrusions corresponding in position to each other; each of the second connecting sheets has a first groove, a second groove, and an abutting section located between the first groove and the second groove and having two ends adjacent to an end of the first groove and an end of the second groove respectively; the two positioning protrusions are capable of being abutted against the abutting sections of the two second connecting sheets respectively; another end of each of the first grooves is defined as a folding end, and another end of each of the second grooves is defined as an unfolding end; each of the positioning protrusions is capable of being stopped against the folding end and the unfolding end so that the swinging bar is capable of being swung relative to the accommodating space in a range defined by the folding ends and the unfolding ends.

4. The foldable parking rack as claimed in claim 1, wherein the two limiting cones are made integrally.

5. The foldable parking rack as claimed in claim 1, wherein each of two opposite sides of the base is extended with at least one supporting part.

6. The foldable parking rack as claimed in claim 5, wherein each of the two opposite sides of the base is extended with two said supporting parts.

7. The foldable parking rack as claimed in claim 6, wherein each of the supporting parts of one of the two opposite sides of the base is provided at a terminal thereof with a protruded connecting block, and each of the supporting parts of the other of the two opposite sides of the base is provided at a terminal thereof with a recessed connecting block capable of being engaged with the protruded connecting block.

* * * * *